United States Patent [19]

Umphries et al.

[11] 4,018,189
[45] Apr. 19, 1977

[54] RETRACTABLE DOG LEASH

[76] Inventors: James Otis Umphries, 14602 Rodeo Drive, Victorville, Calif. 92392; William Howard Brawner, 1174 Cloverleaf Drive, El Cajon, Calif. 92020

[22] Filed: Dec. 18, 1975

[21] Appl. No.: 642,179

[52] U.S. Cl. ............................................... 119/109
[51] Int. Cl.² ........................................ A01K 27/00
[58] Field of Search ....................... 119/109, 106; 242/107.3

[56] References Cited

UNITED STATES PATENTS

| | | | |
|---|---|---|---|
| 2,250,171 | 7/1941 | Wilkins | 242/107.3 |
| 2,889,807 | 6/1959 | Beebe | 119/109 |
| 2,919,676 | 1/1960 | Schneider | 119/109 |
| 3,318,288 | 5/1967 | Mullritter | 119/109 |

FOREIGN PATENTS OR APPLICATIONS 1,063,551   5/1954   France ............................ 119/109

*Primary Examiner*—Hugh R. Chamblee
*Attorney, Agent, or Firm*—Brown & Martin

[57] ABSTRACT

A retractable leash for dogs and other pets. A casing is fastened to a dog collar and remains connected thereto during periods when the animal is not being walked. A rotatable reel is supported in the casing and a flexible leash is wound about the reel. One end of the leash is externally accessible of the casing by connection to a handle. A spring engages both the reel and the casing and tightly coils in response to the unwinding of the leash. A removable cover on one side of the casing facilitates servicing, the cover being locked closed by the attachment to the animal's collar.

2 Claims, 3 Drawing Figures

U.S. Patent
April 19, 1977
4,018,189
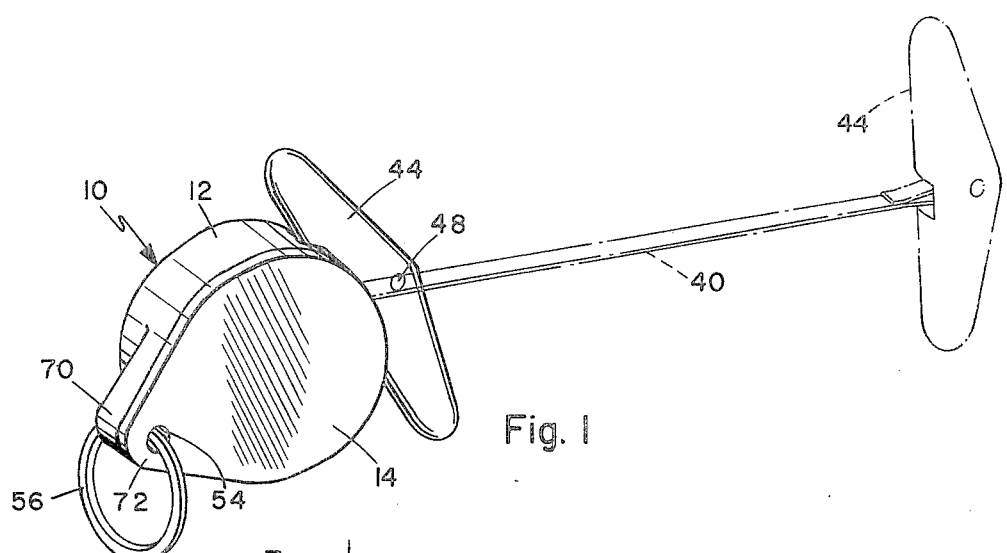
Fig. 1
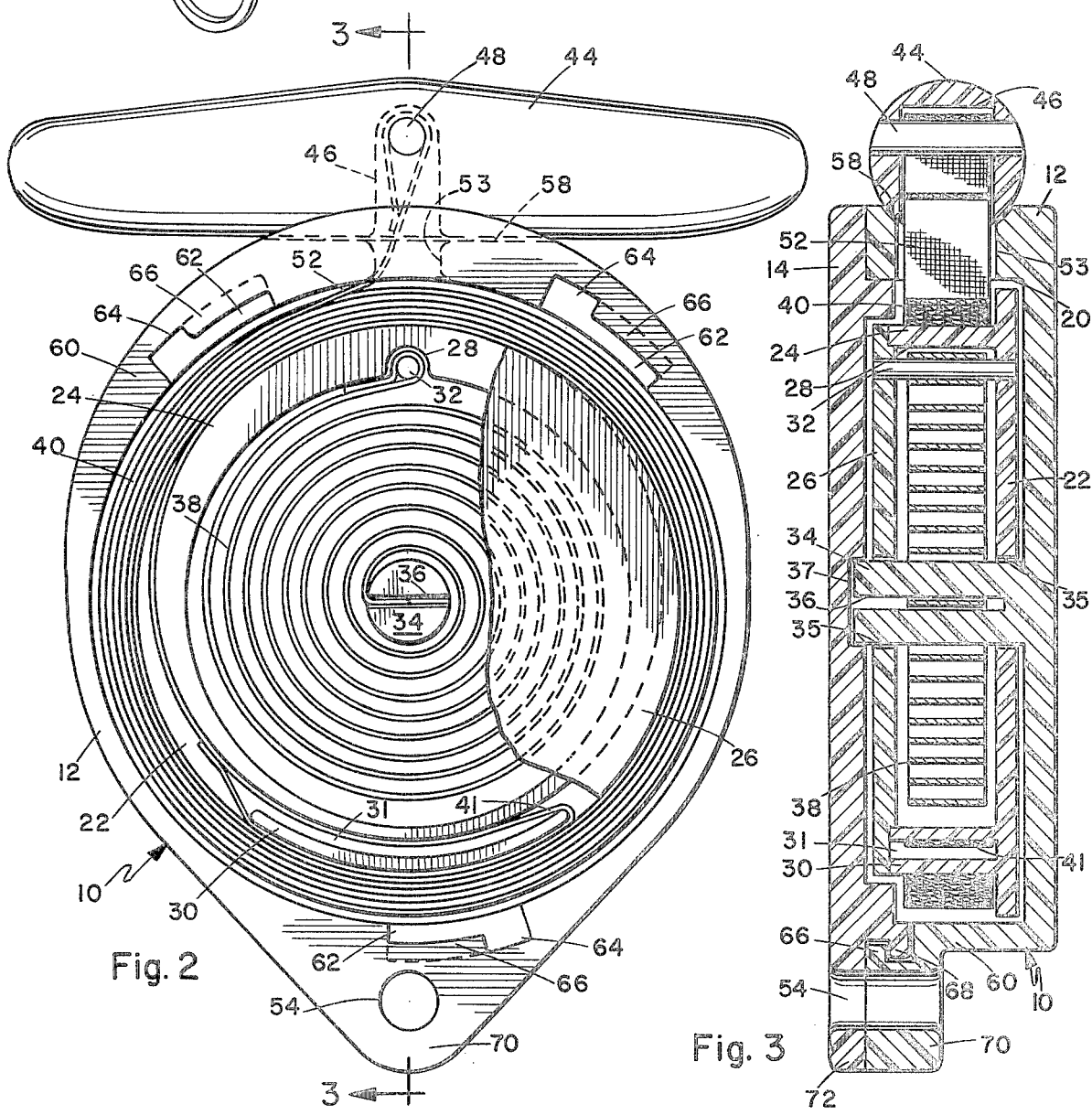
Fig. 2
Fig. 3

RETRACTABLE DOG LEASH

BACKGROUND OF THE INVENTION

Millions of dog and cat house pets are walked at least once each day. Many of these pets are not sufficiently trustworthy to be walked without some type of constraint, such as a leash. The use of leashes causes many conflicts between a pet and its master. Since leashes have a tendency to snag on numerous objects around the house or yard, they are generally removed from the animal when it is confined. Therefore, each time the animal is walked it is necessary for the owner to attach the leash to its collar. Many animals, especially young or untrained pets, are agitated by this task and often struggle with their owner. Consequently, it is desirable to eliminate as much as possible, the repetitive connection and disconnection of leashes to the animal's collar.

Most leashes, at one time or another, are dragged over the ground. When the animal is pulling its owner, the leash is fully extended and does not touch the ground. In cases where the animal changes direction, there is slack in the leash and part may drag on concrete and the like. After a certain period of time, a leash can fray to the point that it must be discarded. As a result it is desirable to eliminate leash wear.

Another problem related to the conventional leash is so serious that it often causes valuable show dogs serious injury and even death. On frequent occasions, show dogs have been upset or agitated and break away from their owner. It is not uncommon for them to drag their leashes behind them. On frequency occasions, the leash catches on some object while the animal is travelling at a relatively fast rate of speed. This can cause a severe jolt to the animal's neck and has been known to actually cause death.

The prior art has not satisfactorily devised a solution to this problem. One prior art device relates to a leash that is desiged to remain connected to an animal collar at all times. When it is desired to walk the animal, the casing that carries the leash is pulled causing the leash to unwind therefrom. The major problem associated with this prior art device is that it is useful only for leashes made from chains. Such leashes are usually metallic, and of substantial weight. Since the animal must bear the entire weight of the device for extended periods, it is suitable only for dogs of great stature and strength. A small or miniature dog cannot bear the weight of the device. It is, therefore, desirable to have a leash that remains connected to the animal's collar at all times but is also light in weight so that it can be borne by even the smallest and weakest animals.

SUMMARY OF THE INVENTION

An exemplary embodiment of the invention is characterized by a casing that defines a central cavity. Reel means is supported within the central cavity and comprises a base part having a spool or drum projecting therefrom. A cover is received over the base part and a pin is supported between the cover and the base part, adjacent the inside edge of the drum. An arcuate member also projects from the base, spaced from the drum. The arcuate member defines a slot between it and the drum. A flexible leash, of a material such as Mylar is wound about the drum and the arcuate member. One end of the leash is threaded through the slot and is looped over and retained on the arcuate member. The other end of the leash passes through a slot in the casing and is accessible externally of the casing.

A split post projects from the casing and through the reel means. An urging means, in the form of a coiled resilient spring has one end connected to the pin, and the other end connected in the post. Grasping means, in the form of a handle is connected to the end of the leash that is accessible externally of the casing. A collar retaining ring is connected in a hole in the casing and is adapted for connection to an animal collar. In use, the handle is pulled, with drawing and unwinding the leash from the drum. In response, the spring tightly coils, urging the reel means in opposition to the force of the unwinding leash. When the handle is released, the spring causes the reel to rotate such that the leash rewinds about the drum.

To facilitate servicing and repair, one side of the casing has a removable cover held by locking lugs which are engaged and disengaged by rotating the cover. The cover is held in closed position by the attachment to the animal's collar.

It is therefore an object of the invention to provide a new and improved retractable animal leash.

Another object of the invention is to provide a new and improved animal leash that remains affixed to the animal collar, even during periods when the animal is not being walked.

Another object of the invention is to provide a new and improved animal leash that is light for convenient carriage by the animal.

Another object of the invention is to provide a new and improved animal leash which is easily opened for servicing.

The above and other objects of the invention will be apparent as the description continues and when read in conjunction with the appended drawings.

BRIEF DESCRIPTION OF THE DRAWINGS

FIG. 1 is a perspective view of the leash unit.

FIG. 2 is an enlarged side view of the unit with the outer cover removed and a portion cut away.

FIG. 3 is a sectional view taken on line 3—3 of FIG. 2.

DETAILED DESCRIPTION OF THE DRAWINGS

In a preferred embodiment of the invention, a casing 10 has a cup shaped back part 12, and an outer cover 14. The casing 10 has a cylindrical cavity 20 in which a reel 22 is rotatably supported. The reel 22 has a spool, in the form of a cylindrical drum 24 that first gradually decreases in thickness around its periphery until the minimum thickness is reached, and then gradually increases in thickness to the maximum. A depression 28 is formed in the drum 24. A pin 32 is supported in the depression 28, between the cover 26 and the reel 22. A split post 34 projects from the part 12, through central openings 35 in the reel 22 and the cover 26, and seats in a recess 37 in the casing cover 14, the post having a slot 36. A coiled resilient spring 38 is carried within the reel 22, one end of the spring being fixed in slot 36 and the other end of the spring being connected to the pin 32. An arcuate member or wall 30 projects from the reel 22 and is radially spaced from the thinnest part of the drum 24 to define a space or slot 31. The leash 40 is reeled radially outwardly about the drum 24 and the wall 30. The inner end of the leash 40 has a loop 41 which is threaded through the slot 31 between the drum 24 and loops over the wall 30 to secure the leash to the reel 22. The other end 52 of the leash 40 passes through a slot 53 formed in the casing 10. A pin 48 is fixed in a socket 46 formed in a handle 44. The leash end 52 is looped over the pin 48 so that when the handle 44 is pulled away from the casing 10, as in FIG. 1, the leash 40 unwinds through the slot 53.

To facilitate servicing and repair, cover 14 is made easily removable. The peripheral wall 60 of casing 10 is provided with a plurality of spaced circumferentially extending slots 62, each having an enlarged opening 64 and an undercut flange 66. Cover 14 has correspondingly spaced hooked lugs 68, which can pass through enlarged openings 64 and are locked under flanges 66 by rotating the cover. The casing and cover have radially projecting lugs 70 and 72, respectively, which are aligned in the closed position of the cover. A common hole 54 extends through the aligned lugs to receive a split ring 56, or similar means for attachment to an animal's collar. The ring 56 holds the cover in the closed position, as in FIG. 1.

When the animal is not being walked, the casing 10 remains connected to the animal collar, and the leash 40 remains wound on the drum 24. When the handle 44 is grasped, and pulled away from the casing 10, the leash 40 unwinds from the drum 24. This results in a clockwise rotation of the reel 22 within the casing 10. It follows that the spring 38 urges the reel 22 in a counter-clockwise direction, thereby causing the leash 40 to rewind about the drum 24. When the leash 40 has completely rewound, the handle 44 seats on the top of the casing 10, and for such purposes, the handle 44 is provided with a depression 58 that mates with a part of the exterior of the casing 10. According to the structure disclosed, when the leash 40 is extended, there is no slack so that it does not drag on the ground. Also, if an animal should inadvertently break away, the action of the spring 38 causes an immediate retraction of the leash 40 and prevents possible snagging that could cause a serious injury to the animal. If the leash should become twisted in use and inadvertently jam while being retracted, the removable cover makes it a simple matter to correct the problem.

Modifications and adaptations in the method and materials of fabrication, in the configuration and assemblage of the constituent elements, are readily permissible within the scope of the instant invention, which changes are intended to be embraced therewithin.

Having described my invention, I now claim:

1. A retractable animal leash comprising:
a casing having a circumferential wall, said wall having circumferentially extending slots therein with undercut flanges over portions of said slots,
a flexible leash member,
a reel rotatably supported within the casing for carrying said leash member, said leash member being wound about said reel and extending externally of said casing for the unwinding of said leash member,
spring means engaging said casing and said reel continuously urging the same in opposition to the unwinding of said leash member,
said casing having a cover detachably secured to one side thereof, said cover having hooked lugs for insertion into said slots and engagement under said flanges by rotation of the cover relative to the casing,
said casing and said cover having corresponding extended lugs thereon, said lugs having a common hole therethrough in the closed position of the cover, and
a ring member removably engaged through said hole for attachment to an animal.

2. A retractable animal leash comprising:
a casing having a circumferential wall, said wall having circumferentially extending slots therein with undercut flanges over portions of said slots,
a flexible leash member,
a reel rotatably supported within the casing for carrying said leash member, said leash member being wound about said reel and extending externally of said casing for the unwinding of said leash member,
spring means engaging said casing and said reel continuously urging the same in opposition to the unwinding of said leash member,
said casing having a cover detachably secured to one side thereof, said cover having hooked lugs for insertion into said slots and engagement under said flanges by rotation of the cover relative to the casing,
said casing and said cover have corresponding extended lugs extending radially outward thereon, said lugs having a common hole therethrough in the closed position of the cover, and
retaining means extending through said hole for attachment to an animal.

* * * * *